United States Patent
Muraki

(10) Patent No.: US 7,286,701 B2
(45) Date of Patent: Oct. 23, 2007

(54) IMAGE SYNTHESIS APPARATUS AND IMAGE SYNTHESIS METHOD

(75) Inventor: Jun Muraki, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 790 days.

(21) Appl. No.: 10/437,720

(22) Filed: May 13, 2003

(65) Prior Publication Data

US 2003/0219156 A1 Nov. 27, 2003

(30) Foreign Application Priority Data

| May 21, 2002 | (JP) | ............................. 2002-145688 |
| Mar. 18, 2003 | (JP) | ............................. 2003-073473 |

(51) Int. Cl.
*G06K 9/00* (2006.01)

(52) U.S. Cl. .................................... 382/167

(58) Field of Classification Search ............... 382/162, 382/163, 164, 165, 166, 254, 274, 276, 305; 358/516, 518; 348/222.1, 223.1, 231.2, 231.3, 348/239–242, 251–253
See application file for complete search history.

(56) References Cited

U.S. PATENT DOCUMENTS

| 4,742,400 A | * | 5/1988 | Tsuji ......................... 358/3.19 |
| 4,833,531 A | * | 5/1989 | Abe et al. .................... 382/300 |
| 5,253,046 A | * | 10/1993 | Shiraishi ..................... 348/237 |
| 5,280,354 A |   | 1/1994 | Nakamura |
| 5,638,364 A | * | 6/1997 | Sugita ......................... 370/397 |
| 5,764,809 A | * | 6/1998 | Nomami et al. ............. 382/284 |
| 5,943,094 A |   | 8/1999 | Sakai et al. |
| 6,342,921 B1 | * | 1/2002 | Yamaguchi et al. ......... 348/322 |
| 6,801,251 B1 | * | 10/2004 | Kawaoka et al. ......... 348/231.3 |
| 6,882,364 B1 | * | 4/2005 | Inuiya et al. ................ 348/252 |
| 6,954,228 B1 | * | 10/2005 | Acharya et al. ......... 348/223.1 |
| 6,982,756 B2 | * | 1/2006 | Nakamura ................... 348/241 |
| 7,016,549 B1 | * | 3/2006 | Utagawa ..................... 382/261 |
| 7,116,819 B2 | * | 10/2006 | Zhang ........................ 382/162 |
| 2002/0008760 A1 |   | 1/2002 | Nakamura |

FOREIGN PATENT DOCUMENTS

| EP | 0 507 593 A2 | 10/1992 |
| EP | 0 858 208 A1 | 8/1998 |
| JP | 07-007675 | 1/1995 |

* cited by examiner

*Primary Examiner*—Jose L. Couso
(74) *Attorney, Agent, or Firm*—Frishauf, Holtz, Goodman & Chick, P.C.

(57) ABSTRACT

Original YC data is converted to Bayer data, and the converted Bayer data is inversely gamma-converted. Picked-up YC data which is a synthesis object is also converted to the Bayer data, and the converted Bayer data is inversely gamma-converted. These inversely gamma-converted original Bayer data and picked-up image data (Bayer data) are added together, and an upper limit value of the added Bayer data is clipped. The added Bayer data whose upper limit value is clipped is subjected to pixel interpolation and gamma conversion, and the gamma-converted Bayer data is converted to the YC data.

20 Claims, 17 Drawing Sheets

FIG.17

| Y | Y | Y |
|---|---|---|
| Y | Y | Y |
| Y | Y | Y |

Y00~22

*

| 1 | 2 | 1 |
|---|---|---|
| 2 | 4 | 2 |
| 1 | 2 | 1 |

LPF

×1/16 →

| | | |
|---|---|---|
| | n | |
| | | |

YL11

IMAGE SYNTHESIS APPARATUS AND IMAGE SYNTHESIS METHOD

CROSS-REFERENCE TO RELATED APPLICATIONS

This application is based upon and claims the benefit of priority from the prior Japanese Patent Applications No. 2002-145688, filed May 21, 2002; and No. 2003-073473, filed Mar. 18, 2003, the entire contents of both of which are incorporated herein by reference.

BACKGROUND OF THE INVENTION

1. Field of the Invention

The present invention relates to an image synthesis apparatus and image synthesis method for synthesizing images.

2. Description of the Related Art

In recent years, a digital camera has generally spread which has a function of synthesizing obtained and recorded image data with one another to generate and record the synthesized image data. In this digital camera, data output from a CCD (Charge Coupled Device) as one type of a solid-state image pickup device is subjected to color processes such as a pixel interpolation process, gamma correction process, white balance process, edge emphasis process, and YC data conversion process (process of converting the CCD output data into YC data including a luminance signal Y and color difference signal C). Thereafter, the image data is recorded in recording media such as a flash memory in predetermined formats such as a joint photographic expert group (JPEG). To synthesize the image data, first and second image data which are synthesis objects are read from the flash memory and extended. The extended image data are synthesized with one another to generate the synthesized image data.

BRIEF SUMMARY OF THE INVENTION

According to an embodiment of the present invention, an image synthesis apparatus comprises:
 a first input unit which inputs color image data which is not subjected to a predetermined color process;
 a second input unit which inputs color image data which is subjected to the predetermined color process;
 a converter which converts the color image data input by the second input unit to color image data in a state before subjected to the predetermined color process; and
 a synthesizer which synthesizes the color image data converted by the converter with the color image data input by the first input unit.

According to an embodiment of the present invention, an image synthesis method comprises:
 inputting color image data which is not subjected to a predetermined color process, and color image data subjected to the predetermined color process;
 converting the input color image data subjected to the predetermined color process to the color image data in a state before subjected to the predetermined color process; and
 synthesizing the converted color image data with the input color image data which is not subjected to the predetermined color process.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which:

Figure 17:
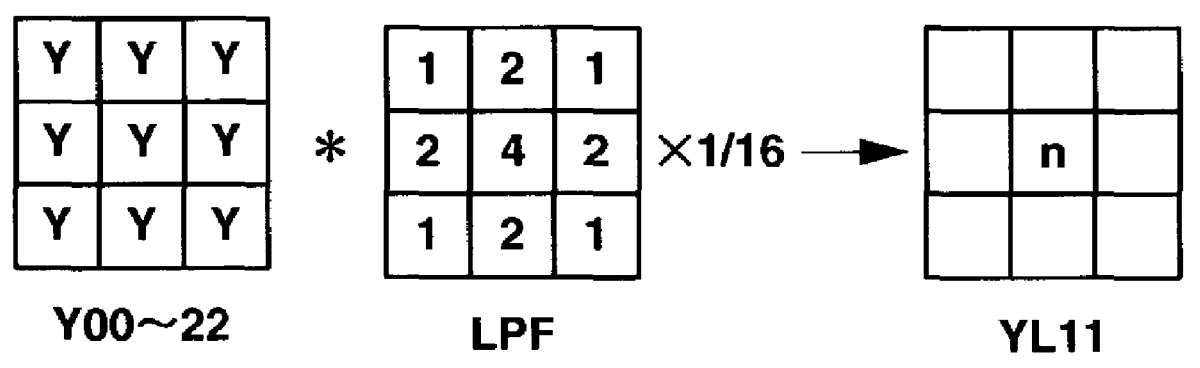

FIG. 17 is an explanatory view showing an LPF process with respect to original YC data of a fourth embodiment.

DETAILED DESCRIPTION OF THE INVENTION

Figure 1:
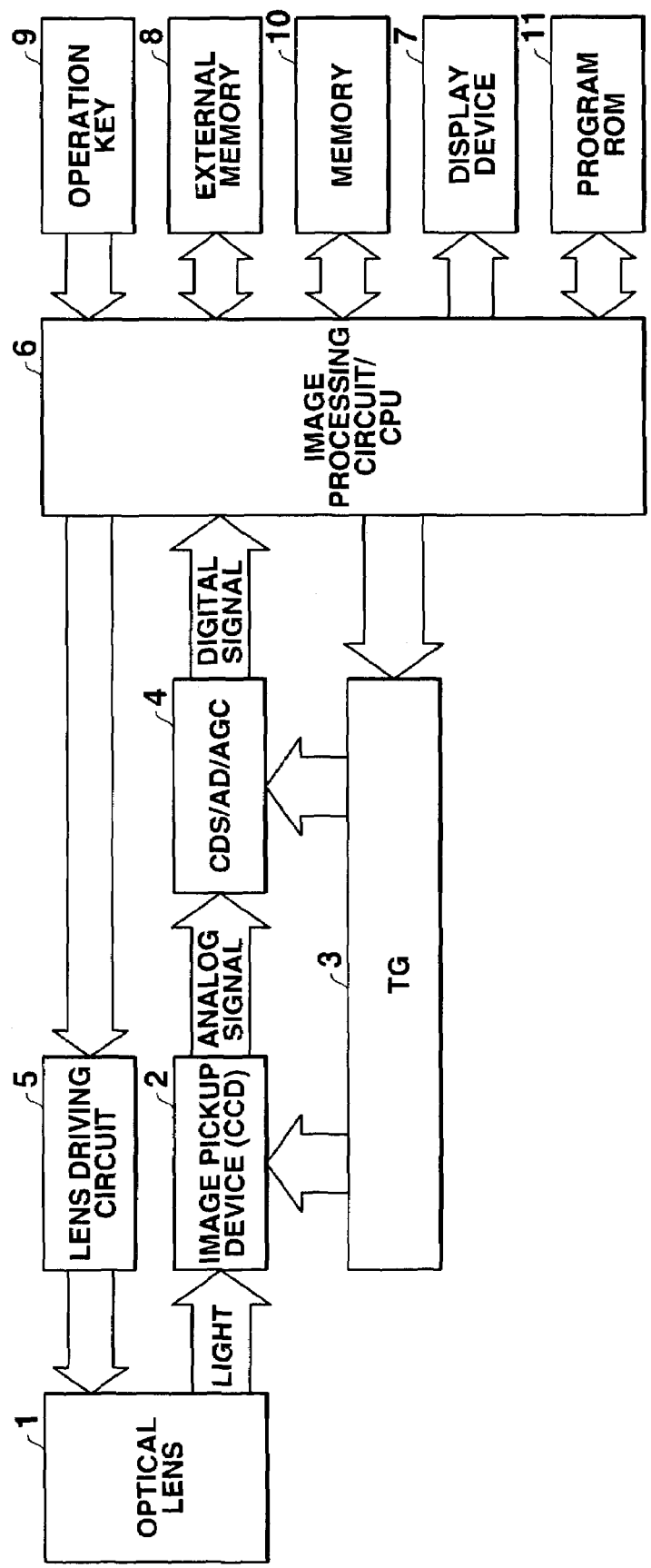
FIG. 1 is a block diagram of a digital camera according to all embodiments of the present invention.

Embodiments of an apparatus according to the present invention will be described hereinafter with reference to the drawings. FIG. 1 is a block diagram showing a constitution of a first embodiment.

First Embodiment

The first embodiment of the present invention will be described hereinafter with reference to the drawings. FIG. 1 is a block diagram showing an electric circuit of a digital camera common to all embodiments. The digital camera includes an optical lens 1; an image pickup device 2 such as a CCD for picking up a subject image formed by the optical lens 1; a timing generator (TG) 3 for driving the image pickup device 2 and a unit circuit 4 described later; and the unit circuit 4 including a correlated double sampling (CDS) for holding an image pickup signal output from the image pickup device 2, an auto gain control (AGC) amplifier for amplifying the image pickup signal, and an A/D converter (AD) for converting the amplified image pickup signal into a digital signal. A color (RGB) filter of primary Bayer color arrangement is disposed in the front surface of the image pickup device 2.

The image of a subject is formed on the image pickup device 2 via the optical lens 1, and the image pickup device 2 outputs the signal. The signal output from the image pickup device 2 is sampled, amplified, and digitized by the unit circuit 4. The Bayer data (RGB data) is sent to an image processing circuit/CPU 6, and is subjected to various signal processes (including a color process) and image process by the process of the image processing circuit/CPU 6.

The optical lens 1 is held by a lens driving circuit 5 including an AF motor. When the lens driving circuit 5 is driven under the control of the image processing circuit/CPU 6, the optical lens 1 moves in an optical axis direction, and adjusts a focus of the subject image formed by the image pickup device 2. At an AE control time, the image pickup device 2 is driven by the timing generator 3 based on a shutter pulse sent from the image processing circuit/CPU 6, and a charge accumulation time is controlled. This realizes an electronic shutter.

The image processing circuit/CPU 6 includes various signal and image processing functions, generates a video signal from the image pickup signal converted into the digital signal through the unit circuit 4 at an image pickup standby time, and displays the subject image picked up by the image pickup device 2 as a through image in a display device 7 including a TFT liquid crystal monitor. At the image pickup time, the image pickup signal is compressed to generate an image file including YC data having a JPEG format. The file is stored in an attachable/detachable external memory 8 including a flash memory. At a reproduction time, the compressed image file is read from the external memory 8, extended, and displayed in the display device 7.

The image processing circuit/CPU 6 is connected to an operation key unit 9 including various switches such as a power switch, shutter key, scroll key, and set key, a memory 10, and a program ROM 11. The memory 10 is a work RAM for use as an operation region in synthesizing/processing the image as described later. The program ROM 11 is an operation program necessary for controlling each component and variously processing the data by the image processing circuit/CPU 6, that is, a program for executing the processes shown in flowcharts described later.

An operation of the digital camera constituted as described above will be described with reference to the flowcharts shown in FIGS. 2 to 5. These flowcharts show that the image data of the original image already picked up and stored in the external memory 8 in the form of YC data (hereinafter referred to as the original YC data) is synthesized with the image data of the picked-up image taken by the image pickup device 2 by the operation of the shutter key before stored in the external memory 8 (hereinafter referred to as the picked-up YC data).

Figure 2:
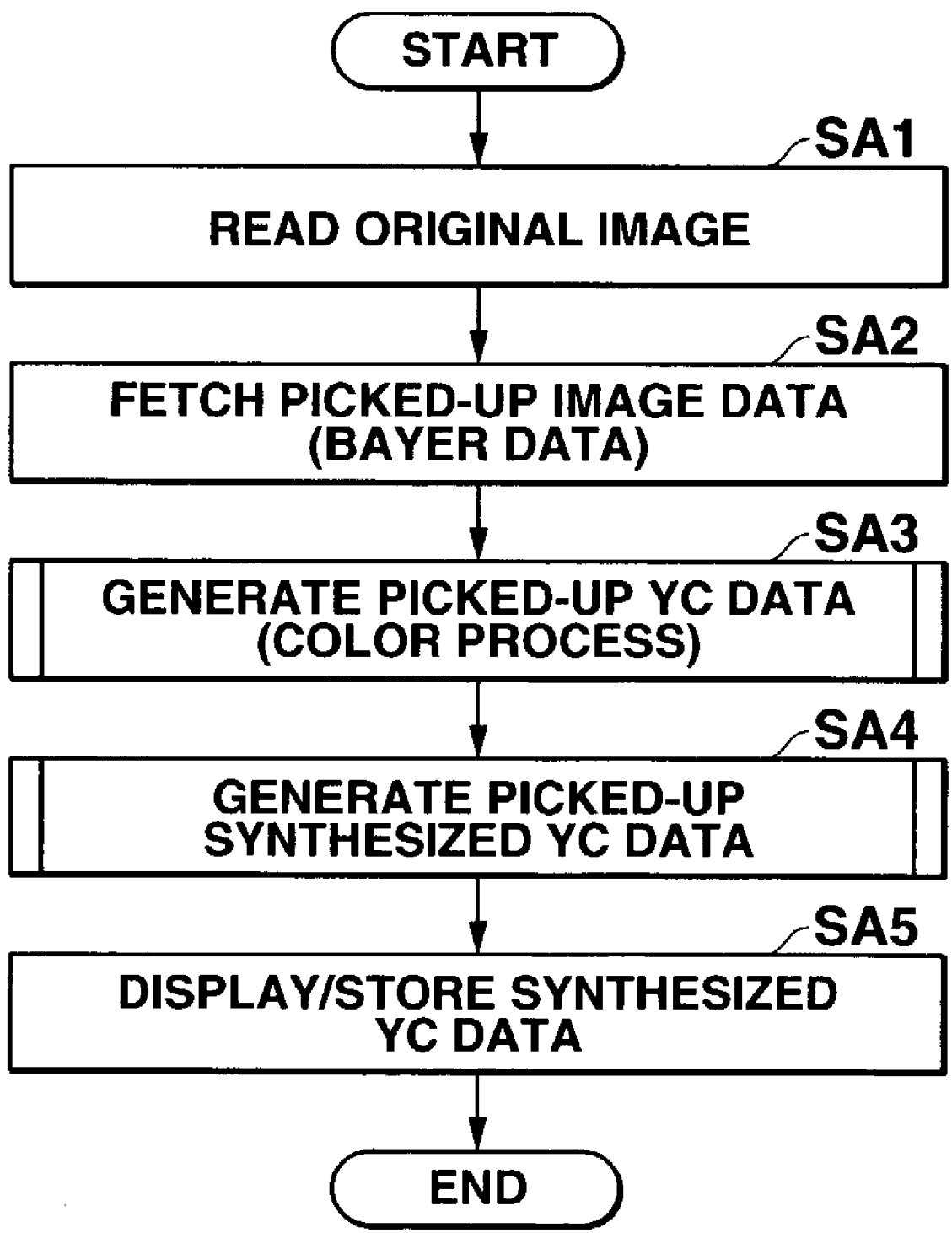
FIG. 2 is a general flowchart of a first embodiment.

The image processing circuit/CPU 6 executes the process according to a whole schematic flow shown in FIG. 2 based on the program, and reads and extends the original YC data which is the synthesis object from the external memory 8 to develop the data on the memory 10 (step SA1). With the operation of the shutter key, the image is picked up by the image pickup device 2, and Bayer data output from the unit circuit 4 (hereinafter referred to as the picked-up image data (Bayer data)) is input (step SA2). As described later, a process of generating the picked-up YC data (color process) is executed based on the picked-up image data (Bayer data) as described later (step SA3). After executing a synthesization (multiplication) YC data generating process as described later (step SA4), the image data obtained by the synthesization YC data generating process (hereinafter referred to as the synthesized YC data) is displayed in the display device 7, and also stored in the memory 10 or the external memory 8 (step SA5).

Figure 3:
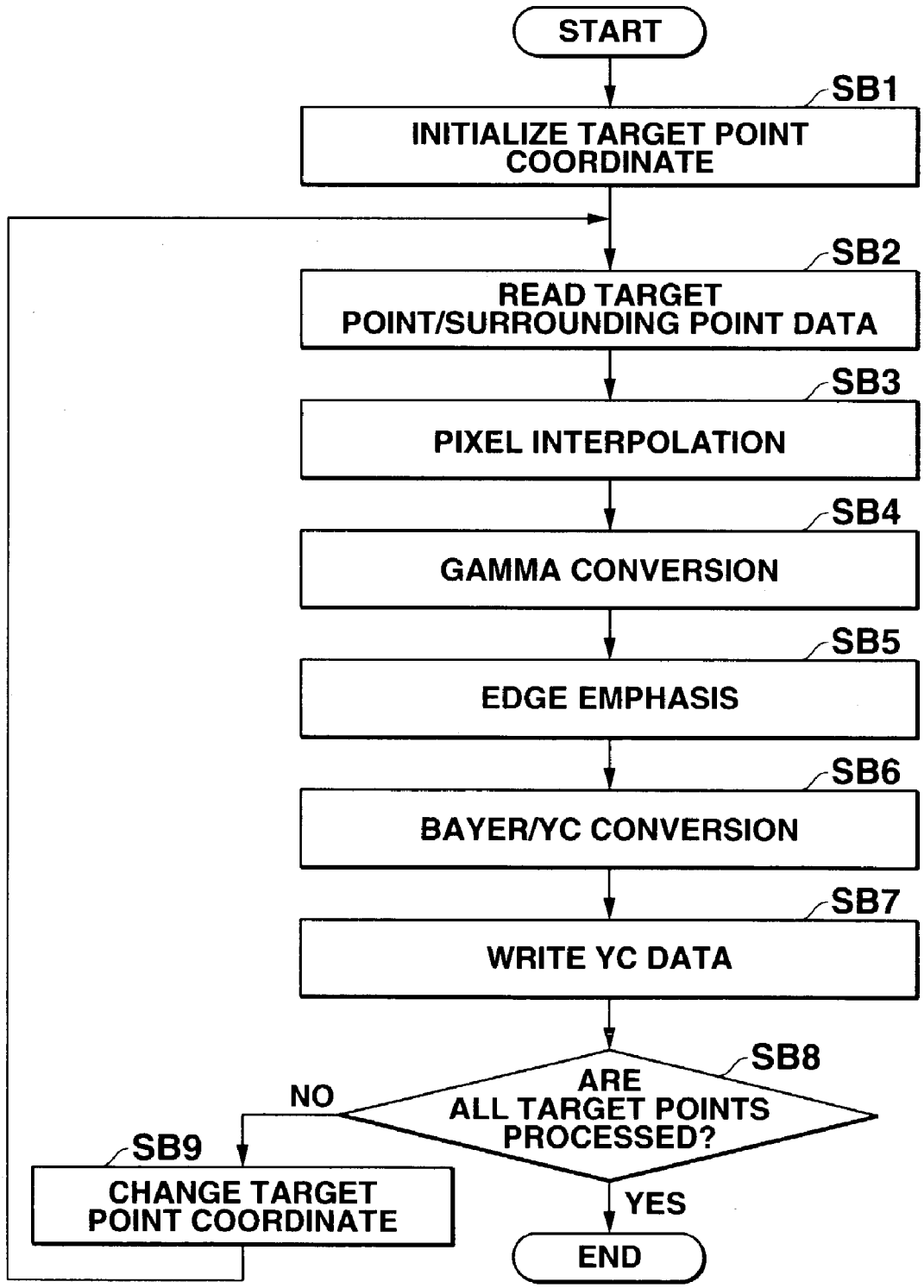
FIG. 3 is a flowchart showing details of step SA3 in the flowchart shown in FIG. 2.

FIG. 3 is a flowchart showing the details of the picked-up YC data generating process (color process) of step SA3. An initial value is set as a value indicating a target point coordinate of the picked-up image data (Bayer data) which is obtained by picking up the image by the image pickup device 2 with the operation of the shutter key, output from the unit circuit 4, and temporarily stored in the memory 10 (step SB1). Target point data and surrounding point data indicated by the initial value are read from the picked-up image data (Bayer data) (step SB2). A pixel interpolation process is executed based on the read target point data and surrounding point data (step SB3). The data subjected to the pixel interpolation is successively subjected to a gamma conversion (gamma correction) process (step SB4), and an edge emphasis process (step SB5). Thereafter, a conversion process into the YC data from the Bayer data (step SB6) is executed, and the picked-up YC data in the corresponding target point (per pixel) is written in the memory 10 (step SB7).

It is determined whether or not the process of the above-described steps SB2 to SB7 is executed with respect to all points (pixels) of the picked-up image data (Bayer data) (step SB8). When the process with respect to all the points is not completed (step SB8; NO), the value indicating a target point coordinate is updated (step SB9), and thereafter the process of steps SB2 to SB7 is executed with respect to the target point indicated by the updated value. When the process of the above-described steps SB2 to SB7 ends with respect to all the points of the picked-up image data (Bayer data), the process following the flow shown in FIG. 3 ends.

Figure 4:
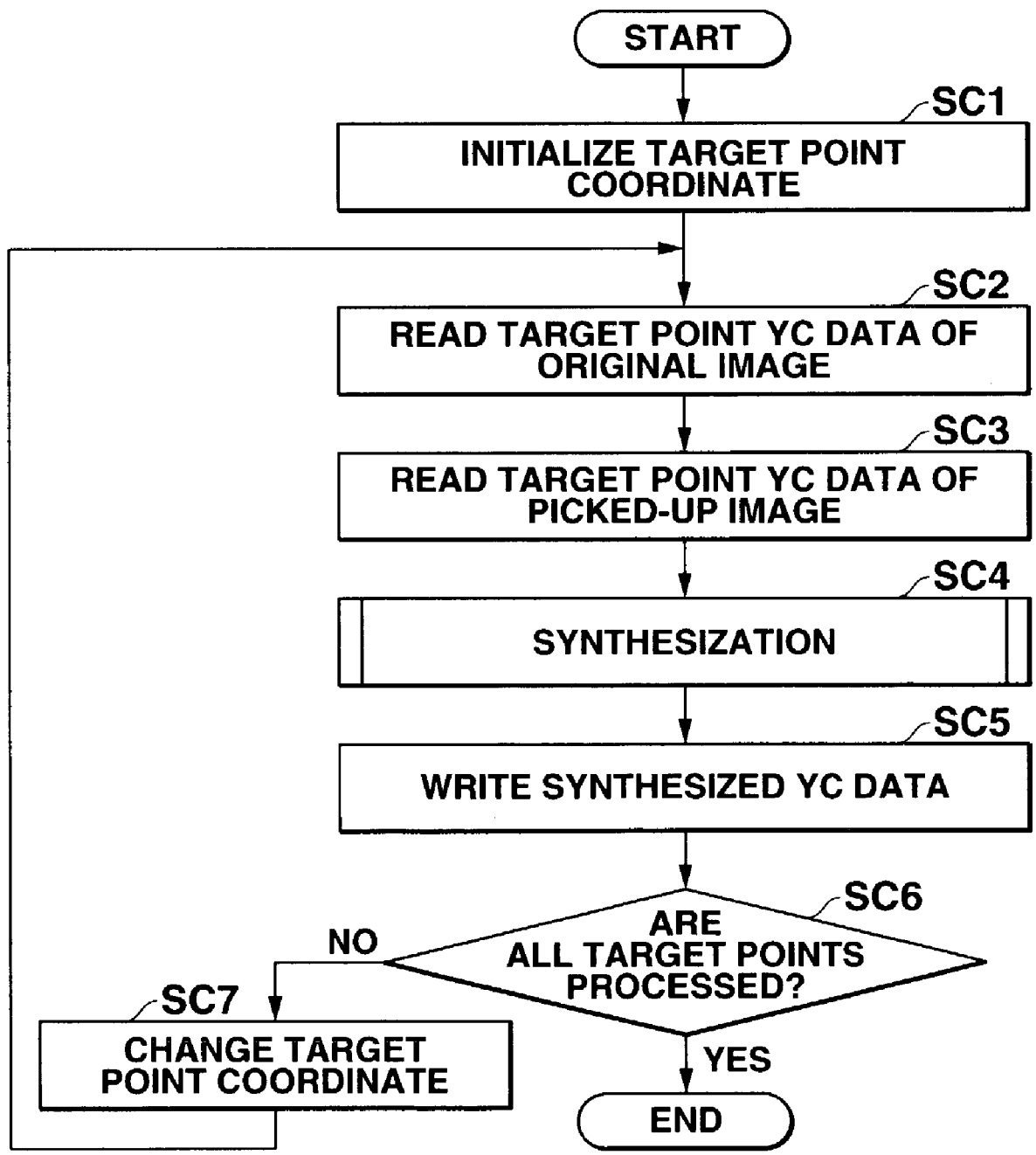
FIG. 4 is a flowchart showing the details of step SA4 in the flowchart shown in FIG. 2.

FIG. 4 is a flowchart showing the details of the synthesized YC data generation process of step SA4. The process comprises setting the initial value as the value indicating the target point coordinate (step SC1); and reading the target point data indicated by the initial value from the original YC data (step SC2). The process further comprises reading the target point data indicated by the initial value also from the picked-up YC data (step SC3); executing a synthesization (multiplication) process in accordance with a flowchart shown in FIG. 5 described later (step SC4); and writing synthesized YC data in the target point in the memory 10 (step SC5).

It is determined whether or not the process of the above-described steps SC2 to SC5 is executed with respect to all the points of the original YC data and picked-up YC data (step SC6). When the process with respect to all the points is not completed (step SC6; NO), the value indicating the target point coordinate is updated (step SC7), and thereafter the process of steps SC2 to SC5 is executed with respect to the target point indicated by the updated value. When the process of the above-described steps SC2 to SC5 ends with respect to all the points of the original YC data and picked-up YC data, the process following the flow shown in FIG. 4 ends.

Figure 5:
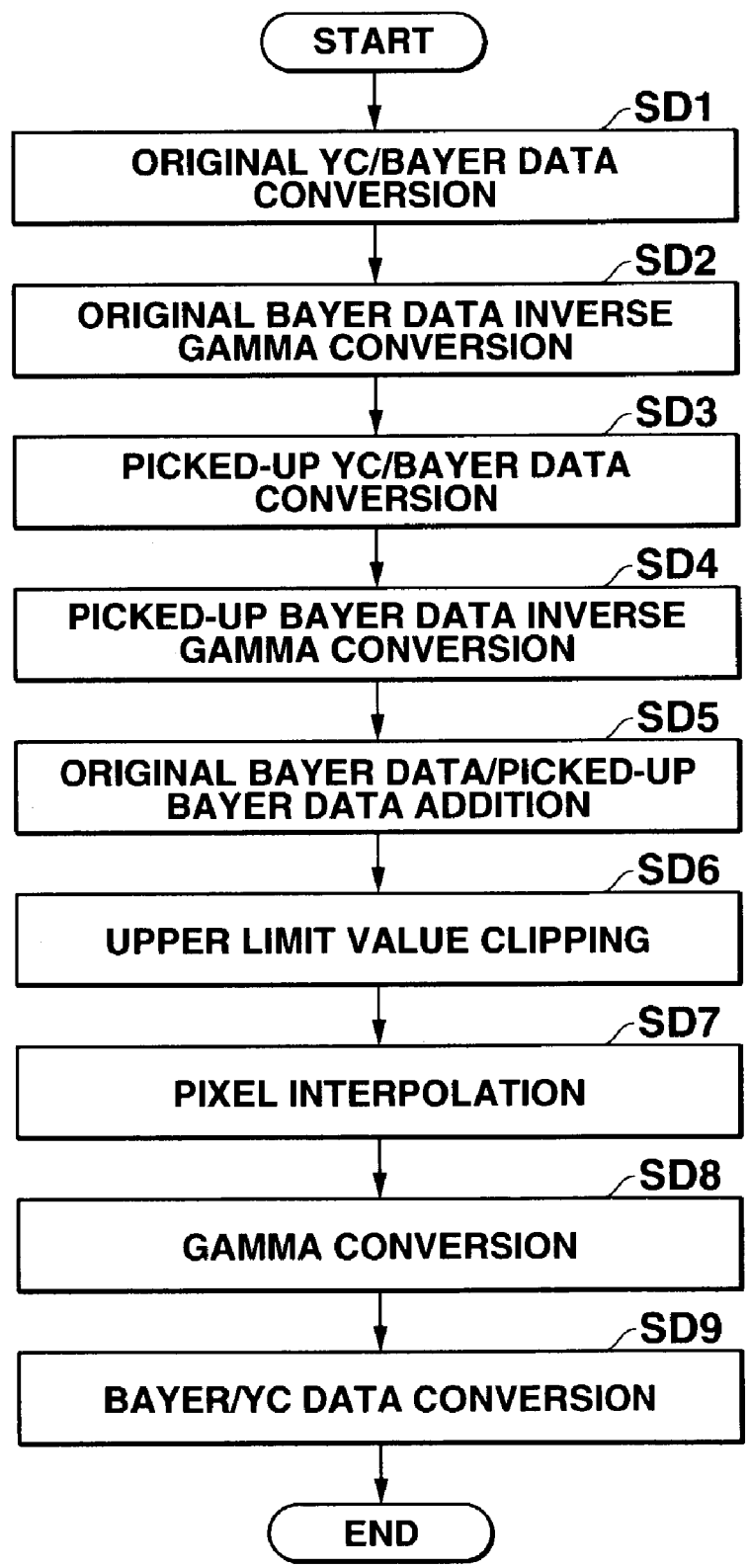
FIG. 5 is a flowchart showing the details of step SC4 in the flowchart shown in FIG. 4.

FIG. 5 is a flowchart showing the details of the synthesization process of step SC4 shown in FIG. 4. The process comprises converting the original YC data in the target point to Bayer data (step SD1); and inversely gamma-converting the converted Bayer data of the target point (step SD2). That is, a process of imparting linearity is executed with respect to the data which has already been subjected to the gamma correction and which has non-linearity to return the data to a state before the gamma correction. The process further comprises converting the picked-up YC data in the target point to the Bayer data (step SD3); and inversely gamma-converting the converted Bayer data of the target point (step SD4). These inversely gamma-converted Bayer data of the original image and picked-up image in the target point are added together (step SD5), and an upper limit value of the added Bayer data is clipped (step SD6). After executing a pixel interpolation process with respect to the Bayer data whose upper limit value is clipped (step SD7), the data is gamma-converted (step SD8), and the gamma-converted Bayer data is converted to the YC data (step SD9).

Therefore, when the process shown in the flowchart of FIG. 5 is executed in step SC4 of FIG. 4, all the points of the original YC data and picked-up YC data are subjected to the Bayer data conversion and inverse gamma correction and added together. Thereafter, the data is subjected to the pixel interpolation and gamma correction to generate the synthesized YC data (synthesized image data) including the YC data.

Figure 6:
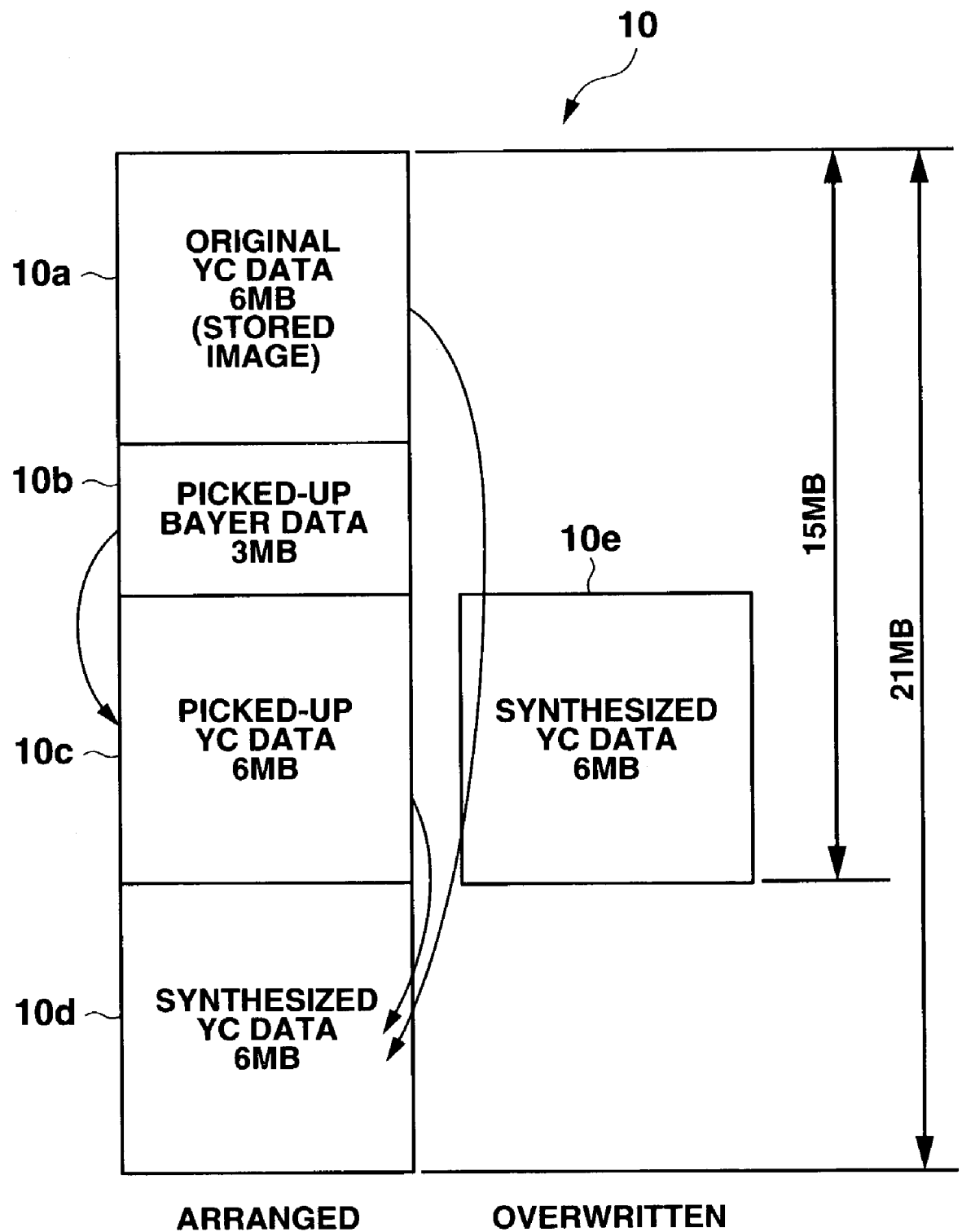
FIG. 6 is an explanatory view showing a memory map of the first embodiment.

When the process shown in the flowcharts shown in FIGS. 2 to 5 is executed, for example, assuming that an image size is 2048×1568 pixels, a format of each YC data is 4:2:2 in terms of each byte of YcbCr, and the Bayer data is 1 byte/pixel, as shown in FIG. 6, in the memory 10, 6 MB is required in developing the original YC data (10a). When the picked-up image data (Bayer data) is stored, 3 MB is required (10b). When the picked-up image data (Bayer data) is converted to the picked-up YC data, 6 MB is required (10c). The conversion to the synthesized YC data requires 6 MB (10d). Therefore, when there is a capacity of 21 MB in the memory 10, the synthesized YC data can be generated based on the original YC data and picked-up YC data. When the synthesized YC data is overwritten onto the picked-up YC data (10e), and when there is a capacity of 15 MB in the memory 10, the synthesized YC data can be generated based on the original YC data and picked-up YC data. Therefore, the image can be synthesized with a memory capacity smaller than that of the prior art.

As shown in the flowcharts of FIGS. 2 to 5, when the image is synthesized, the original YC data and picked-up YC data already subjected to the gamma correction are subjected to the inverse gamma correction, and both the YC data are synthesized. Therefore, the correction process of the image is not completed, which has heretofore been required in order to avoid the deterioration of the image quality and which requires a large memory capacity and requires much time for a correction calculation process. Then, the images can be synthesized by a simple and short-time process without deteriorating the image quality.

In the present embodiment, the original image stored beforehand is synthesized with the picked-up image before stored. However, it is also possible to synthesize the original images, that is, the images stored/recorded already in the external memory 8.

Other embodiments of the digital camera according to the present invention will be described. The same portions as those of the first embodiment will be indicated in the same reference numerals and their detailed description will be omitted.

Second Embodiment

Figure 7:
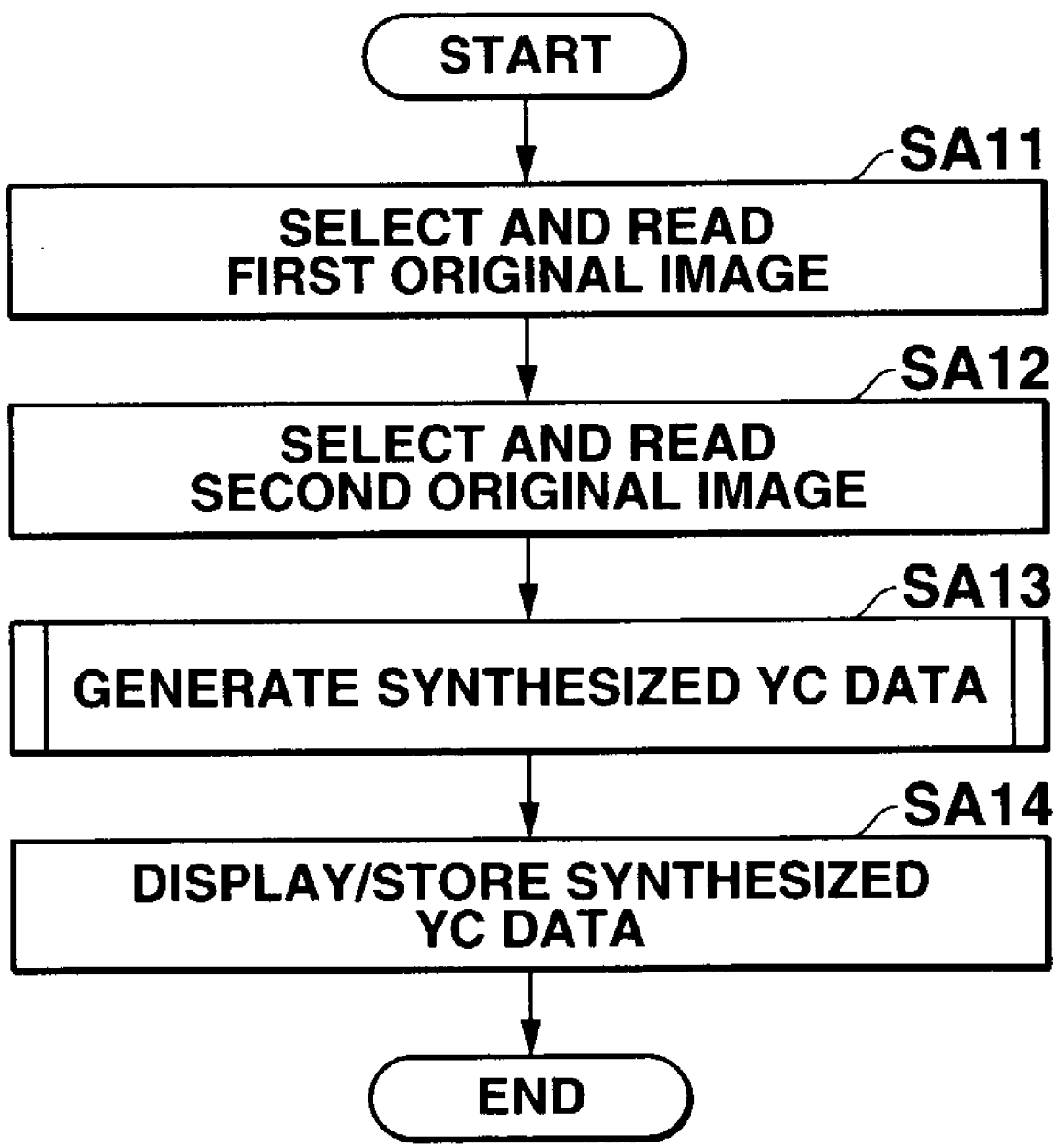
FIG. 7 is a general flowchart of a second embodiment.

FIG. 7 shows the synthesis of first and second original YC data which are already picked-up and stored in the external memory 8 in the form of the YC data.

The image processing circuit/CPU 6 executes the process based on the program according to the whole schematic flow shown in FIG. 7.

The process comprises selecting, reading, and extending the first original YC data which is the synthesis object from the external memory 8 to develop the data on the memory 10 (step SA11). For example, the process comprises successively switching and displaying a plurality of YC data recorded in the external memory 8 in the display device 7 in accordance with a scroll key operation; and operating a set key to select the first original YC data at a time when the YC data desired to be synthesized is displayed. The second original YC data which is the synthesis object is selected and read from the external memory 8, and extended and developed on the memory 10 (step SA12). After executing the synthesized YC data generation process (step SA13), the synthesized YC data obtained by the synthesized YC data generation process is stored in the memory 10 or the external memory 8 (step SA14).

Figure 8:
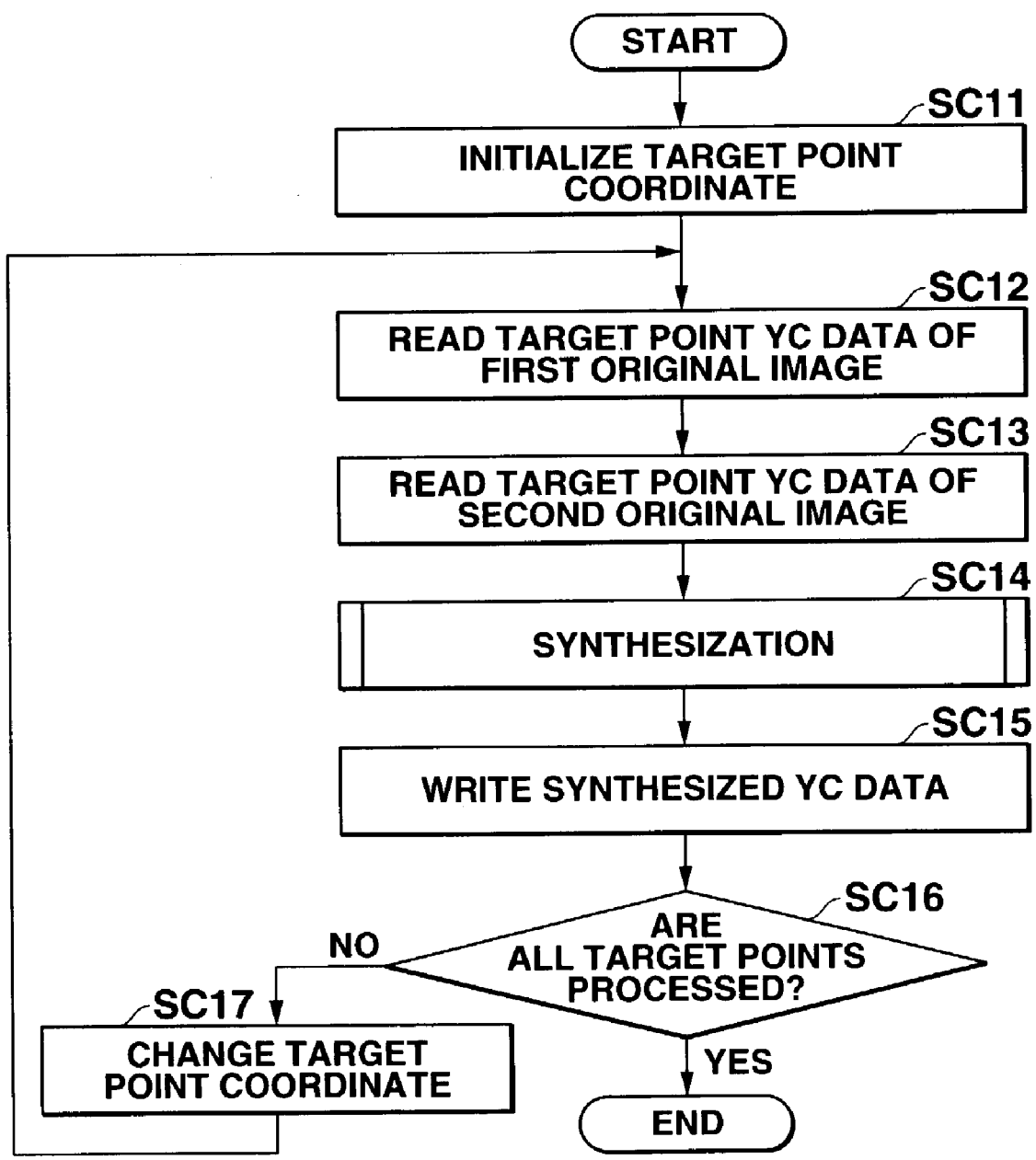
FIG. 8 is a flowchart showing the details of step SA13 in the flowchart shown in FIG. 7.

FIG. 8 is a flowchart showing the details of the synthesized YC data generation process of step SA13. The process comprises setting the initial value as the value indicating the target point coordinate (step SC11); and reading the target point data indicated by the initial value from the first original YC data (step SC12). The process further comprises reading the target point data indicated by the initial value also from the second original YC data (step SC13); executing the synthesization process in accordance with the flowchart shown in FIG. 9 described later (step SC14); and writing the synthesized YC data in the target point in the memory 10 (step SC15).

It is determined whether or not the process of the above-described steps SC12 to SC15 is executed with respect to all the points of the first and second original YC data (step SC16). When the process with respect to all the points is not completed (step SC16; NO), the value indicating the target point coordinate is updated (step SC17), and thereafter the process of steps SC12 to SC15 is executed with respect to the target point indicated by the updated value. When the process of the above-described steps SC12 to SC15 ends with respect to all the points of the first and second original YC data, the process following the flow shown in FIG. 8 ends.

Figure 9:
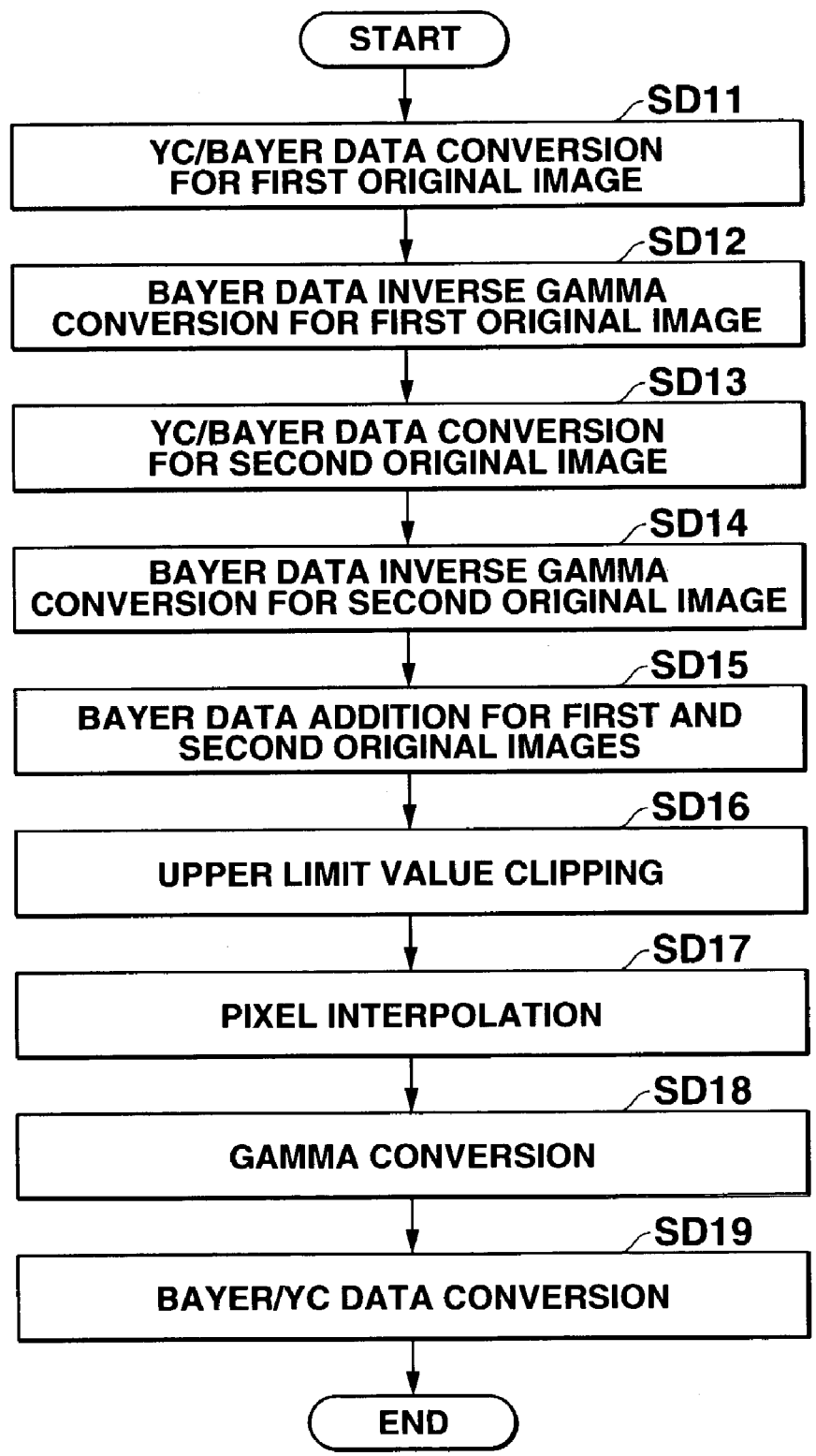
FIG. 9 is a flowchart showing the details of step SC14 in the flowchart shown in FIG. 8.

FIG. 9 is a flowchart showing the details of the synthesization process of step SC14 shown in FIG. 8. The process comprises converting the first original YC data in the target point to Bayer data (step SD11); and inversely gamma-converting the converted Bayer data of the target point (step SD12). That is, the process of imparting the linearity is executed with respect to the data which has already been subjected to the gamma correction and which has the non-linearity, to return the data to the state before the gamma correction. The process further comprises also converting the second original YC data in the target point to the Bayer data (step SD13); and inversely gamma-converting the converted Bayer data of the target point (step SD14). These inversely gamma-converted Bayer data of the first and second original images in the target point are added together (step SD15), and the upper limit value of the added Bayer data is clipped (step SD16). After executing the pixel interpolation process with respect to the Bayer data whose upper limit value is clipped (step SD17), the data is gamma-converted (step SD18), and the gamma-converted Bayer data is converted to the YC data (step SD19).

When the process shown in the flowchart of FIG. 9 is executed in step SC14 of FIG. 8, all the points of the first and second original YC data are subjected to the Bayer data conversion and inverse gamma correction and added together. Thereafter, the data is subjected to the pixel interpolation and gamma correction to generate the synthesized YC data (synthesized image data) including the YC data.

When the process shown in the flowcharts shown in FIGS. 7 to 9 is executed, for example, assuming that the image size is 2048×1568 pixels, the format of each YC data is 4:2:2 in terms of each byte of YcbCr, and the Bayer data is 1 byte/pixel, in the memory 10, 6 MB is required in developing the first original YC data. When the second original Bayer data is developed, 6 MB is required. The conversion to the synthesized YC data requires 6 MB. Therefore, when there is a capacity of 18 MB in the memory 10, the synthesized YC data can be generated based on the first and second original YC data. Moreover, when the synthesized YC data is overwritten onto the first or second original YC data, and when there is a capacity of 12 MB in the memory 10, the synthesized YC data can be generated based on the first and second original YC data. Therefore, the image can be synthesized with the memory capacity smaller than that in the prior art.

Furthermore, as shown in the flowcharts of FIGS. 7 to 9, when the image is synthesized, the first and second original YC data already subjected to the gamma correction are subjected to the inverse gamma correction, and both the YC data are synthesized. Therefore, the correction process of the image is not completed, which has heretofore been required in order to avoid the deterioration of the image quality and which requires the large memory capacity and much time for the correction calculation process. Then, the images can be synthesized by the simple and short-time process without deteriorating the image quality.

Third Embodiment

As shown in FIGS. 10 to 13, in a third embodiment of the present invention, the original YC data already picked-up and stored in the external memory 8 in the form of the YC data is synthesized with the picked-up image data (Bayer data) taken by the image pickup device 2 by the operation of the shutter key before subjected to various color processes.

Figure 10:
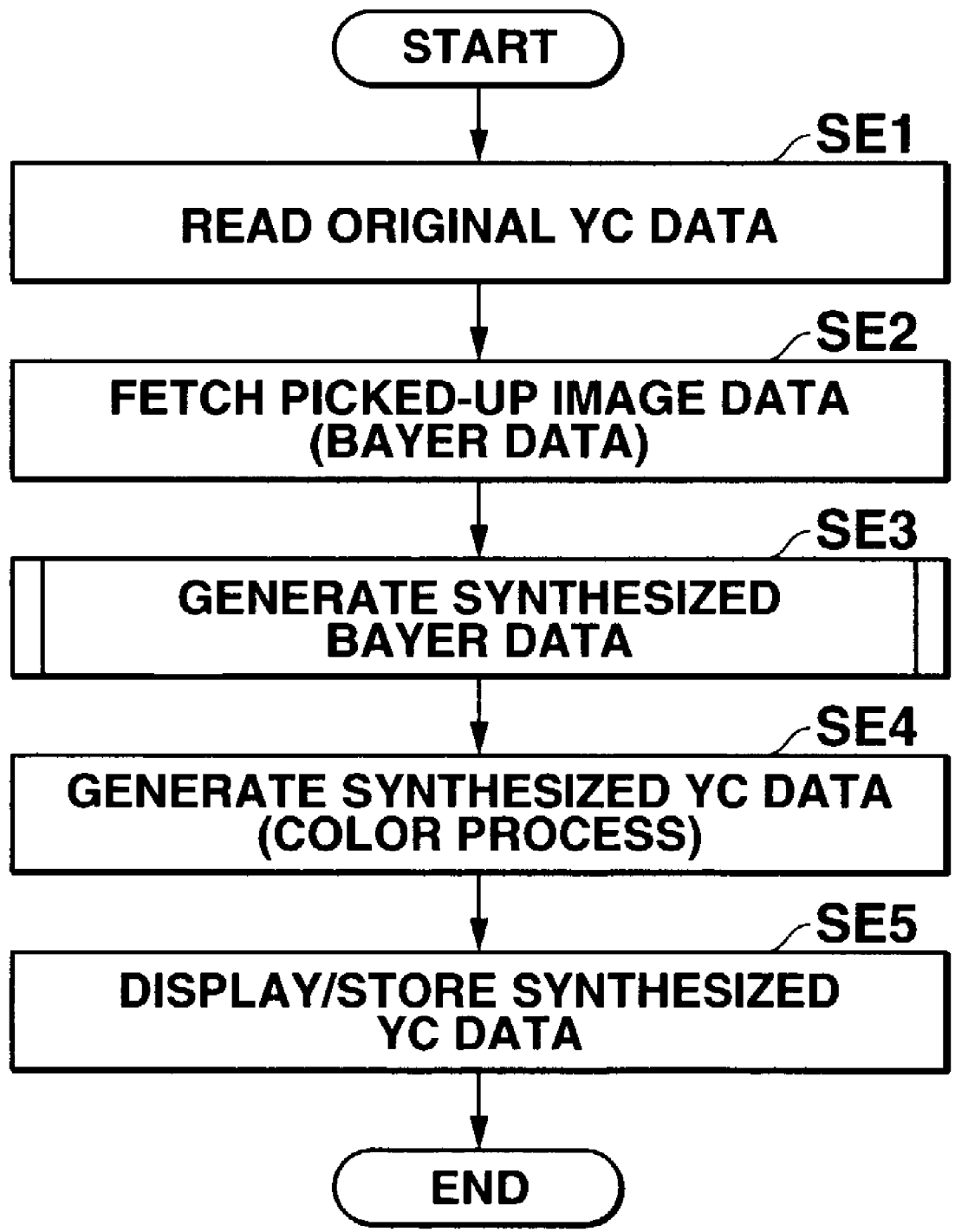
FIG. 10 is a general flowchart of a third embodiment.

The image processing circuit/CPU 6 executes the process based on the program according to the whole schematic flow shown in FIG. 10, and reads and extends the original YC data which is the synthesis object from the external memory 8 to develop the data on the memory 10 (step SE1). With the operation of the shutter key, the image is picked up by the image pickup device 2, and the picked-up image data (Bayer data) output from the unit circuit 4 is taken in (step SE2). As described later, a multiple Bayer data generation process is executed (step SE3). After executing the synthesized YC data generation process (color process) (step SE4), the image data obtained by the synthesized YC data generating process (color process) is displayed in the display device 7, and also stored/recorded in the external memory 8 (step SE5).

Figure 11:
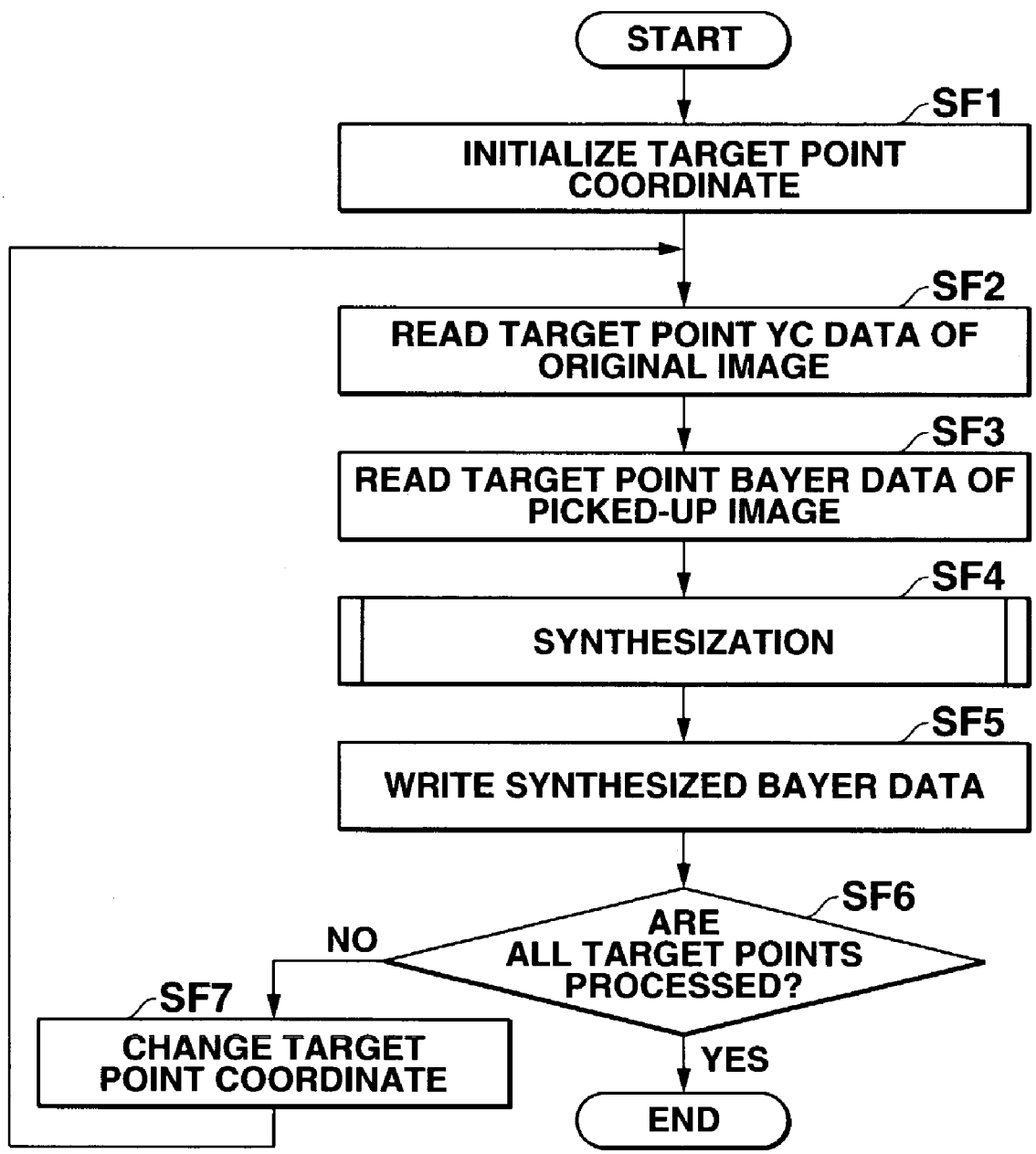
FIG. 11 is a flowchart showing the details of step SE3 in the flowchart shown in FIG. 10.

FIG. 11 is a flowchart showing the details of multiple Bayer data generation of step SE3. The initial value is set as the value indicating the target point coordinate (step SF1). Subsequently, the target point data indicated by the initial value is read from the original YC data developed in the memory 10 (step SF2). The process further comprises reading the target point data indicated by the initial value also from the picked-up image data (Bayer data) which is picked-up by the image pickup device 2 by the operation of the shutter key, output from the unit circuit 4, and temporarily stored in the memory 10 (step SF3). The read target point data of the original YC data and the target point data of the picked-up image data (Bayer data) are used to execute the synthesization process as described later (step SF4). The multiplexed Bayer data in the target point generated by the synthesization process is written in the memory 10 (step SF5).

It is determined whether or not the process of the above-described steps SF2 to SF5 is executed with respect to all the points of the original YC data and picked-up image data (Bayer data) (step SF6). When the process with respect to all the points is not completed (step SF6; NO), the value indicating the target point coordinate is updated (step SF7), and thereafter the process of steps SF2 to SF5 is executed with respect to the target point indicated by the updated value. When the process of the above-described steps SF2 to SF5 ends with respect to all the points of the original YC data and picked-up image data (Bayer data), the process following the flow shown in FIG. 11 ends.

Figure 12:
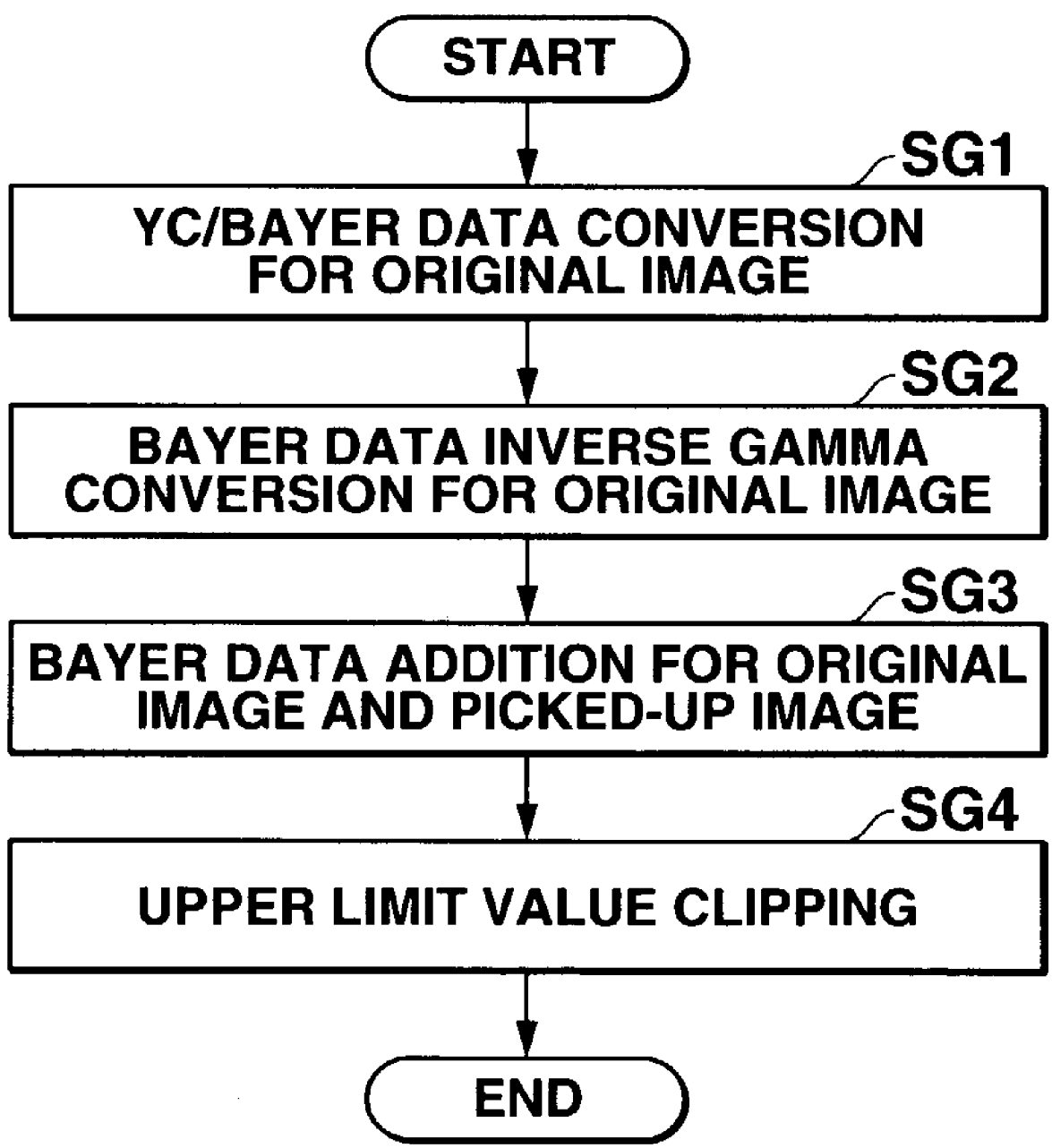
FIG. 12 is a flowchart showing the details of step SF4 in the flowchart shown in FIG. 11.

FIG. 12 is a flowchart showing the synthesization process of step SF4 shown in FIG. 10 in detail. By a "original image YC/Bayer data conversion" process, the original YC data in the target point is converted to the Bayer data (step SG1). By an "original Bayer data inverse gamma correction" process, the Bayer data of the target point is inversely gamma-converted so that the data can be treated equally to the Bayer data of the picked-up image (step SG2). By an "original Bayer data/picked-up image data (Bayer data) addition" process in this state, the original Bayer data and picked-up image data (Bayer data) in the target point are added together (step SG3). The upper limit value of the Bayer data after the addition is clipped (step SG4), and the synthesization process per pixel is completed.

Therefore, when the process shown in the flowchart of FIG. 12 is executed in step SF4 of FIG. 10, all the points (pixels) of the original YC data and picked-up image data (Bayer data) are added together in the form of the Bayer data to generate the multiple Bayer data (synthesized image data).

In the flowchart shown in FIG. 10, in the synthesized YC data generation (color process) of step SE4 following step SE3, the same process as the process of the flowchart shown in FIG. 3 is executed.

That is, the process comprises setting the initial value as the value indicating the target point coordinate of the picked-up image data (Bayer data) which is obtained (step SB1); and reading the target point data and surrounding point data indicated by the initial value from the multiple Bayer data (step SB2). Based on the read target point data and surrounding point data, the pixel interpolation process (step SB3), the gamma conversion process (step SB4), and the edge emphasis process (step SB5) are successively executed. Thereafter, the conversion process into the YC data from the Bayer data (step SB6) is executed, and the synthesized YC data in the corresponding target point (per pixel) is written in the memory 10 (step SB7).

It is determined whether or not the process of the above-described steps SB2 to SB7 is executed with respect to all the points (pixels) of the multiple Bayer data (step SB8). When the process with respect to all the points is not completed (step SB8; NO), the value indicating the target point coordinate is updated (step SB9), and thereafter the process of steps SB2 to SB7 is executed with respect to the target point indicated by the updated value. When the process of the above-described steps SB2 to SB7 is executed with respect to all the points of the multiple Bayer data, the process following the flow shown in FIG. 3 ends.

Figure 13:
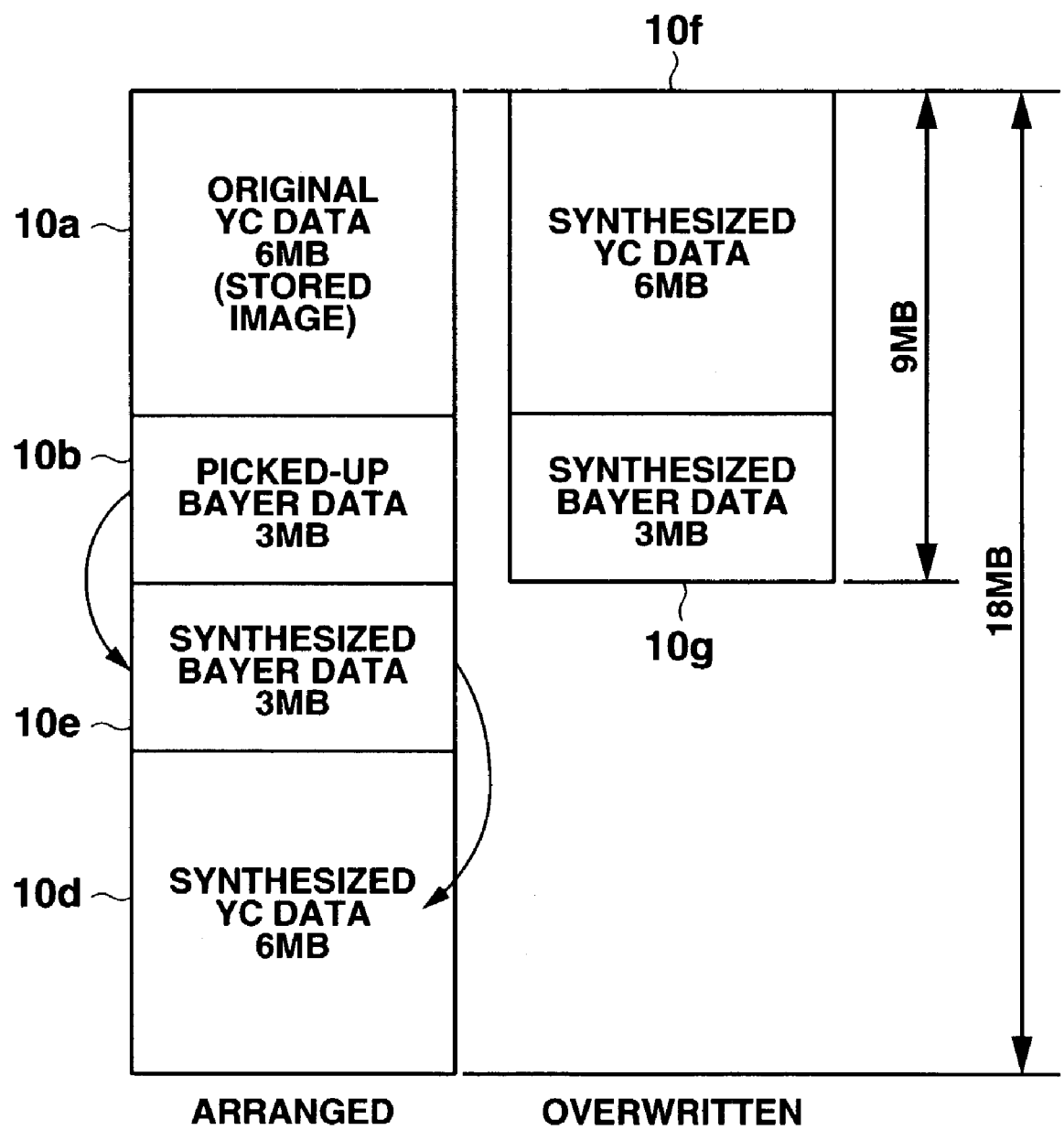
FIG. 13 is an explanatory view showing the memory map of the third embodiment.

When the process shown in the flowcharts of FIGS. 10 to 12 and 3 is executed, for example, when the image size is 2048×1568 pixels, and when all the data is arranged in the memory 10 as shown in FIG. 13, the original YC data; 6 MB (10a), the picked-up image data (Bayer data); 3 MB (10b), the multiple Bayer data; 3 MB (10e), and the synthesized YC data; 6 MB (10d) result. Therefore, when there is a capacity of 18 MB in the memory 10, the synthesized YC data can be generated based on the original YC data and the picked-up image data (Bayer data) before subjected to the color process. Moreover, the synthesized YC data and original YC data, and the picked-up image data (Bayer data) and multiple Bayer data can be overwritten. Considering this, when there is a capacity of 9 MB in the memory 10, the synthesized YC data can be generated. Therefore, the data can be synthesized with a small memory capacity.

Furthermore, in the present embodiment, multiplication in the synthesization process occurs only in the "original image YC/Bayer data conversion" in step SG1 of FIG. 12. The multiplication herein is basically matrix calculation of 3×3. However, any one of RGB may be calculated by the color of the Bayer arrangement. Therefore, the number of multiplications is three per pixel. Therefore, a time for a complicated calculation process is not required, and the images can be synthesized by the simple and short-time process without deteriorating the image.

Fourth Embodiment

FIGS. 14 to 17 shows a fourth embodiment of the present invention in which the original YC data already picked-up and stored in the form of the YC data in the external memory 8 is synthesized with the picked-up image data (Bayer data) taken in by the image pickup device 2 by the operation of the shutter key before subjected to the color process.

Figure 14:
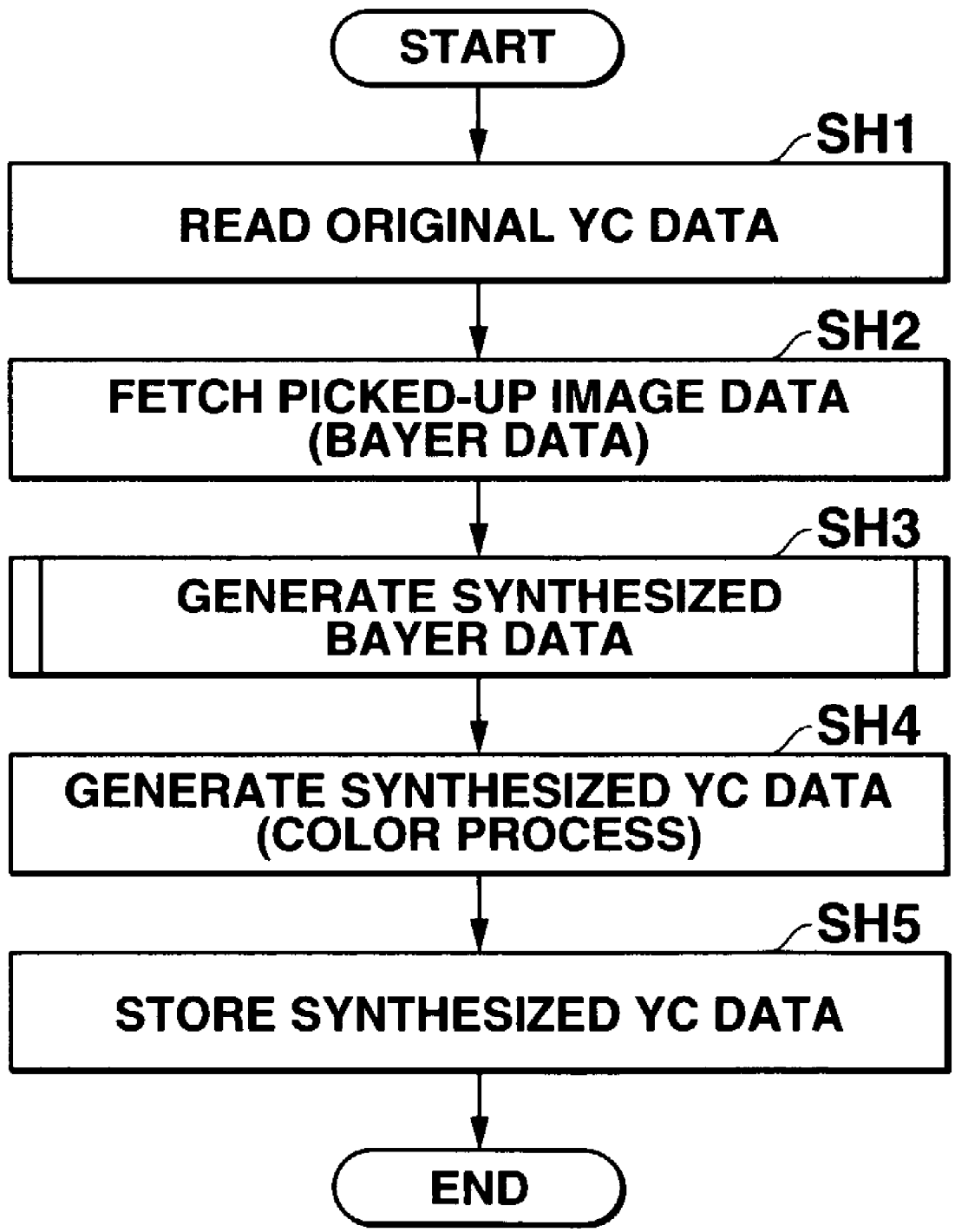
FIG. 14 is a general flowchart of the third embodiment.
Figure 15:
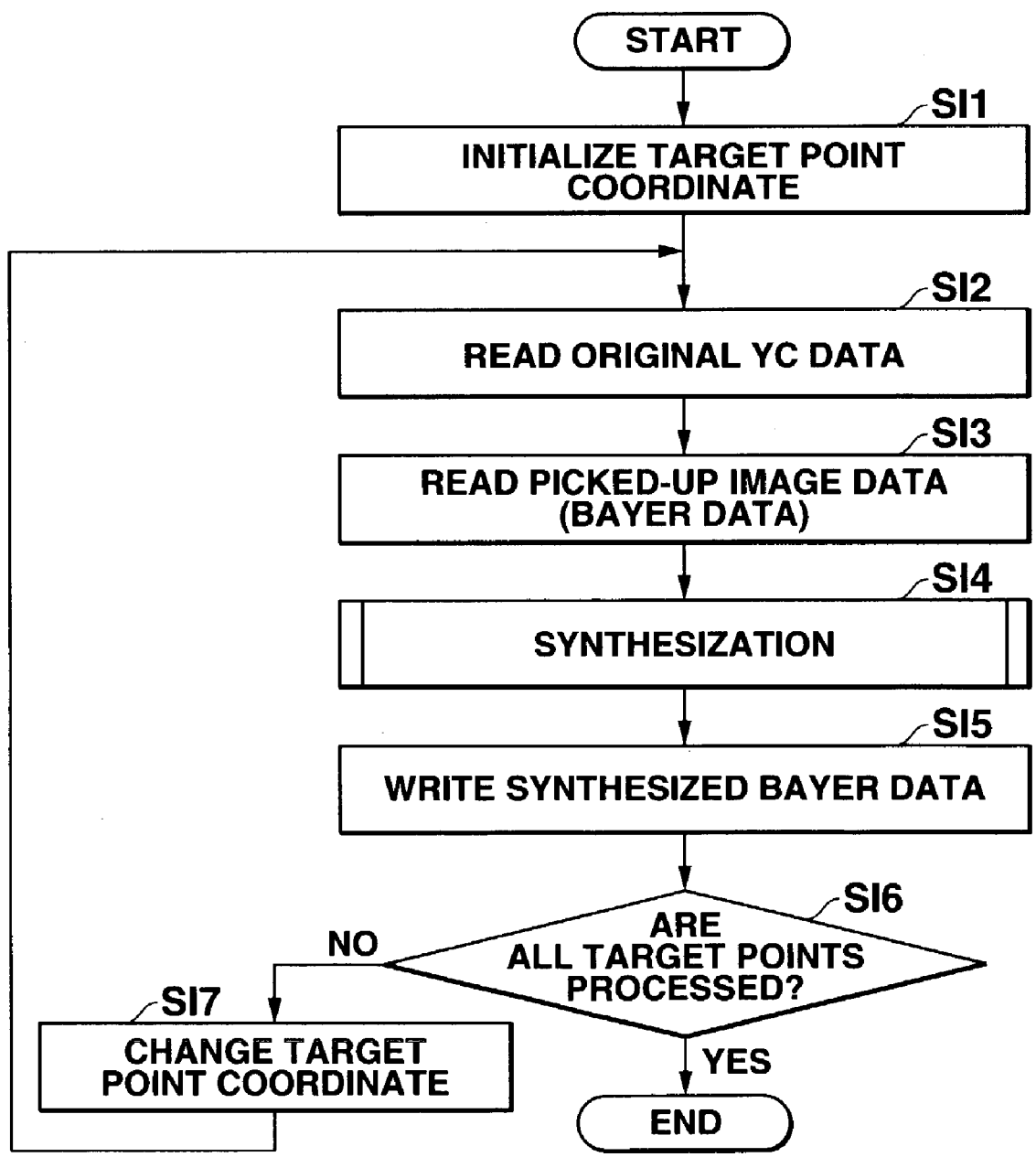
FIG. 15 is a flowchart showing the details of step SH3 in the flowchart shown in FIG. 14.

The image processing circuit/CPU 6 executes the process based on the program according to the whole schematic flow shown in FIG. 14. The process of steps SH1 to SH5 in the whole schematic flow is the same as that of steps SE1 to SE5 of FIG. 10 described above. FIG. 15 is a flowchart showing the details of the synthesized Bayer data generation of step SH3. The process of steps SI1 to SI7 in the flowchart is also the same as that of steps SF1 to SF7 of FIG. 11.

Figure 16:
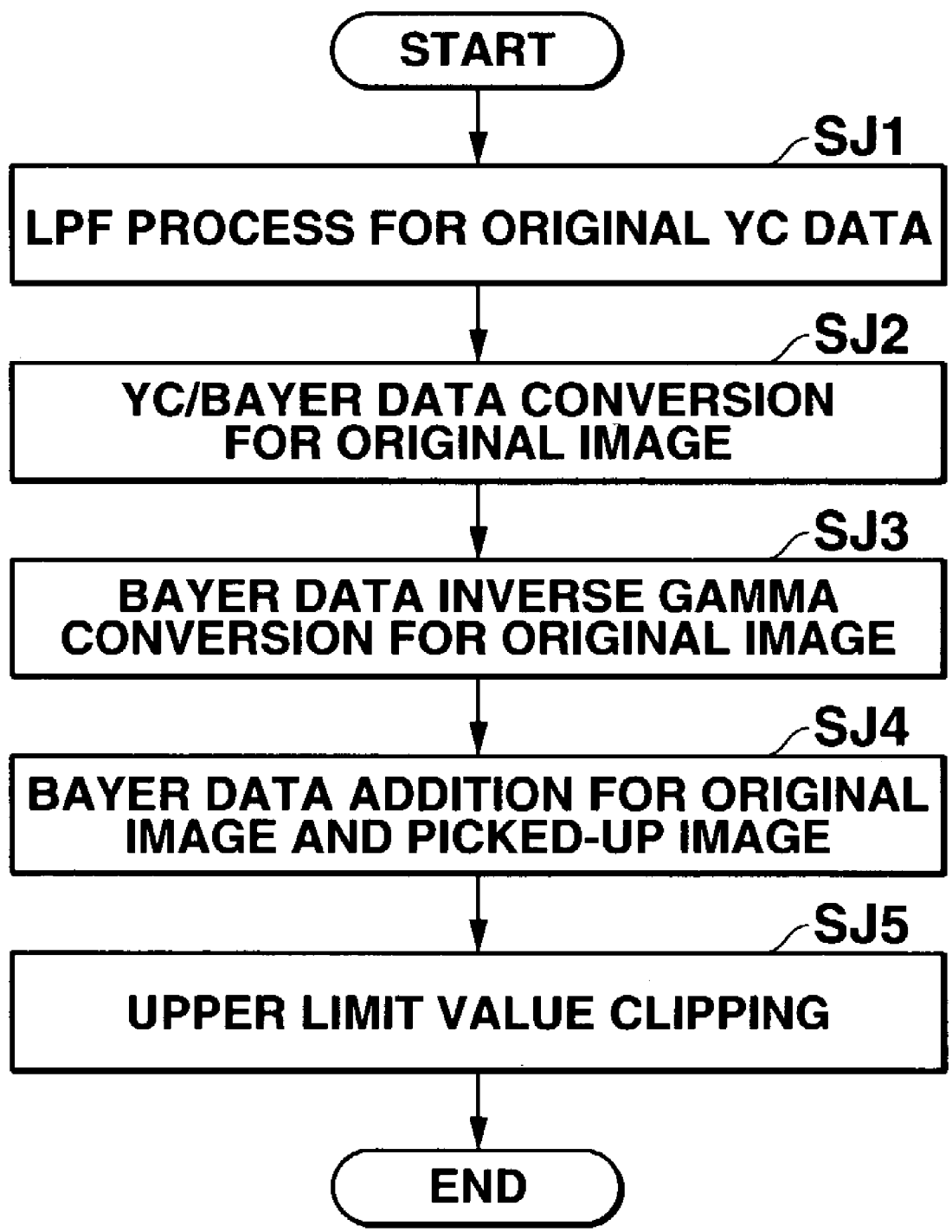
FIG. 16 is a flowchart showing the details of step SI4 in the flowchart shown in FIG. 15.

FIG. 16 is a flowchart showing the details of the synthesization process of step SI4 shown in FIG. 15 (step SJ1). In the process of step SJ1, a low-pass filter (LPF) process is executed with respect to the original YC data in the synthesization calculation. The content of the calculation is shown in FIG. 14 in which Y is an example.

That is, when a low-pass component of Y is calculated in a certain target point (coordinate (1, 1) in the example of the drawing), convolution calculation of a filter coefficient is executed with respect to the data of surrounding nine points (horizontal 3×vertical 3) centering on the target point. Here, when matrices LFP(0, 0) to LFP(2, 2) of LPF are convoluted in Y(i−1, j−1) to Y(i−1+1, j−1+1), and YL(i, j) is calculated, the following equation results.

$$YL(i, j) = \frac{1}{16}\sum_{m=0}^{2}\sum_{n=0}^{2} Y(i-1+m, j-1+n)LPF(m, n)$$

When the process of step SJ1 is executed in this manner, the same process as that of steps SG1 to SG4 of FIG. 12 is executed with respect to the low-pass component of the original YC data obtained by the process of step SJ1 in the following steps SJ2 to SJ5.

That is, as compared with the picked-up image data (Bayer data) before the color process, the original YC data is usually data after executing the edge emphasis which is one of the color processes, and therefore many high-pass components are contained. Therefore, when the data is used as such to execute the multiple process/color process, the high-pass component of the original image is further subjected to the edge emphasis (see the flowchart of FIG. 3), and an image containing many unnecessary high-pass components is obtained. However, in the fourth embodiment, the LPF is applied beforehand with respect to the original YC data. Thereafter, the multiple process/color process is executed. Therefore, the unnecessary high-pass components of the image after the multiple process are reduced. As a result, the images can be synthesized without deteriorating the image.

In the present embodiment, the constitution of the filter is 3×3, but other constitutions such as 5×5 may also be used. Moreover, the filter process is executed at a synthesization process time, but the filter process may also be executed immediately after reading the original YC data.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, the present invention can be practiced as a computer readable recording medium in which a program for allowing the computer to function as predetermined means, allowing the computer to realize a predetermined function, or allowing the computer to conduct predetermined means.

In the first to fourth embodiments, the Bayer data of CCD is a primary-color Bayer arrangement (RGB), but may also be an arrangement of complimentary colors (YMC). Furthermore, the format of each YC data is 4:2:2 in terms of each byte of YcbCr, but may also be 4:2:0.

In the first to fourth embodiments, the synthesis of the still images has been described, but the present invention can also be applied to synthesis of movie images, or synthesis of the movie image with the still image.

In the first to fourth embodiments, the application of the present invention to the multiple synthesis (addition) of the images has been described, but it is also possible to apply the present invention to subtraction of the images. For example, the present invention is also considered to be applied to a case in which the image data obtained in a closed state of a shutter is subtracted from the image data obtained in an opened state of the shutter in order to remove noises.

In any one of the first to fourth embodiments, the application of the present invention to the digital camera has been described, but it is also possible to apply the present invention to any apparatus as long as the apparatus has imaging functions such as a cellular phone terminal including the camera, portable information terminal including the camera, and personal computer including the camera.

In the first to fourth embodiments, the application of the present invention to the apparatus having the photographing function has been described, but it is possible to apply the present invention to the cellular phone terminal, portable information terminal, and personal computer which do not have any camera function. In short, the present invention can be applied to any apparatus, as long as the apparatus includes an image synthesis function.

What is claimed is:

1. An image synthesis apparatus comprising:
a first input unit which is configured to input color image data which is not subjected to a predetermined gamma correction process;
a second input unit which is configured to input color image data which is subjected to the predetermined gamma correction process;
a converter which is configured to convert the color image data input by the second input unit to color image data in a state before the color image data was subjected to the predetermined gamma correction process; and
a synthesizer which is configured to synthesize the color image data converted by the converter with the color image data input by the first input unit.

2. The apparatus according to claim 1, further comprising:
a memory which is configured to store the color image data subjected to the predetermined gamma correction process, wherein the second input unit inputs the color image data stored in the memory.

3. The apparatus according to claim 2, wherein the memory stores a plurality of color image data subjected to the predetermined gamma correction process,
wherein the apparatus further comprises a selector which is configured to select arbitrary color image data from the plurality of color image data stored in the memory, and
wherein the second input unit inputs the color image data selected by the selector.

4. The apparatus according to claim 2, further comprising:
an image pickup unit which is configured to pick up an image of a subject and to output color image data corresponding to the picked-up image; and
a processor which is configured to execute the predetermined gamma correction process with respect to the color image data output from the image pickup unit,
wherein the memory stores the color image data subjected to the predetermined gamma correction process by the processor.

5. The apparatus according to claim 1, further comprising:
an image pickup unit which is configured to pick up an image of a subject and to output color image data corresponding to the picked-up image; and
a processor which is configured to execute the predetermined gamma correction process with respect to the color image data output from the image pickup unit,
wherein the second input unit inputs the color image data subjected to the predetermined gamma correction process by the processor.

6. The apparatus according to claim 1, further comprising:
an image pickup unit which is configured to pick up an image of a subject and to output color image data corresponding to the picked-up image; and
a processor which is configured to execute the predetermined gamma correction process with respect to the color image data output from the image pickup unit,
wherein the first input unit inputs the color image data before the color image data is subjected to the predetermined gamma correction process by the processor.

7. The apparatus according to claim 1, further comprising:
a memory which is configured to store the color image data subjected to the predetermined gamma correction process,
wherein the converter converts the color image data stored in the memory to the color image data in the state before the color image data was subjected to the predetermined gamma correction process, and
wherein the first input unit inputs the color image data converted to the state before the color image data was subjected to the predetermined gamma correction process by the converter.

8. The apparatus according to claim 7, wherein the memory stores a plurality of color image data subjected to the predetermined gamma correction process,
wherein the apparatus further comprises a selector which is configured to select arbitrary color image data from the plurality of color image data stored in the memory, and
wherein the converter converts the arbitrary color image data selected by the selector to the color image data in the state before the color image data was subjected to the predetermined gamma correction process.

9. The apparatus according to claim 7, further comprising:
an image pickup unit which is configured to pick up an image of a subject and to output color image data corresponding to the image of the subject; and
a processor which is configured to execute the predetermined gamma correction process with respect to the color image data output from the image pickup unit,
wherein the memory stores the color image data subjected to the predetermined gamma correction process by the processor.

10. The apparatus according to claim 1, further comprising:
a memory which is configured to store the synthesized color image data synthesized by the synthesizer.

11. The apparatus according to claim 1, further comprising:
a display unit which is configured to display the synthesized color image data synthesized by the synthesizer.

12. The apparatus according to claim 1, further comprising:
a processor which is configured to execute the predetermined gamma correction process with respect to the synthesized color image data synthesized by the synthesizer.

13. The apparatus according to claim 1, wherein the second input unit inputs color image data subjected to the predetermined gamma correction process and to an edge emphasis process,
wherein the apparatus further comprises a filter which is configured to subject the color image data input by the second input unit to a filter process for reducing high-frequency components, and wherein the synthesizer synthesizes the color image data subjected to the filter process and converted by the converter with the color image data input by the first input unit.

14. The apparatus according to claim 13, wherein the first input unit inputs color image data which is not subjected to the predetermined gamma correction process and the edge emphasis process.

15. The apparatus according to claim 14, further comprising:
an image pickup unit which is configured to pick up an image of a subject and to output color image data corresponding to the image; and
a processor which is configured to execute the predetermined gamma correction process and the edge emphasis process with respect to the color image data output from the image pickup unit,
wherein the first input unit inputs the color image data before the color image data is subjected to the predetermined gamma correction process and the edge emphasis process.

16. The apparatus according to claim 13, further comprising:
an edge emphasis processor which is configured to subject the synthesized image data synthesized by the synthesizer to the edge emphasis process.

17. An image synthesis method comprising:
inputting color image data which is not subjected to a predetermined gamma correction process, and color image data subjected to the predetermined gamma correction process;
converting the input color image data subjected to the predetermined gamma correction process to color image data in a state before the color image data was subjected to the predetermined gamma correction process; and
synthesizing the converted color image data with the input color image data which is not subjected to the predetermined gamma correction process.

18. The apparatus according to claim 1, wherein:
the first input unit is configured to input color image Bayer data which is not subjected to the predetermined gamma correction process;
the second input unit is configured to input color image Bayer data which is subjected to the predetermined gamma correction process;
the converter is configured to convert the color image Bayer data input by the second input unit to color image Bayer data in a state before the color image Bayer data was subjected to the predetermined gamma correction process; and
the synthesizer is configured to synthesize the color image Bayer data converted by the converter with the color image Bayer data input by the first input unit.

19. An image synthesis apparatus comprising:
a first input unit which is configured to input color image Bayer data;
a second input unit which is configured to input luminance/color difference image data;
a converter which is configured to convert the luminance/color difference image data input by the second input unit to color image Bayer data; and
a synthesizer which is configured to synthesize the color image Bayer data converted by the converter with the color image Bayer data input by the first input unit.

20. An image synthesis method comprising:
inputting color image Bayer data and luminance/color difference image data;
converting the input luminance/color difference image data to color image Bayer data; and
synthesizing the converted color image Bayer data with the input color image Bayer data.

* * * * *